United States Patent [19]

Lorsch

[11] 4,013,193
[45] Mar. 22, 1977

[54] APPARATUS FOR DISPERSING PLANAR NON-CIRCULAR OBJECTS

[76] Inventor: Johannes Lorsch, An der Bleiche 49, D-4172 Straelen, Germany

[22] Filed: Sept. 16, 1975

[21] Appl. No.: 613,736

[30] Foreign Application Priority Data

Sept. 23, 1974 Germany .......................... 2445338

[52] U.S. Cl. .............................................. 221/264
[51] Int. Cl.² ...................................... B65G 59/00
[58] Field of Search .......... 221/263, 264, 265, 289, 221/290, 264, 265, 246, 251, 298–301, 303

[56] References Cited

UNITED STATES PATENTS

| | | | |
|---|---|---|---|
| 969,844 | 9/1910 | Clawson ............................. | 221/264 |
| 1,648,476 | 11/1927 | Du Grenier ........................ | 221/264 |
| 3,156,340 | 11/1964 | Arkes ................................. | 221/264 X |
| 3,351,172 | 11/1967 | Hatanaka et al. .................. | 221/264 X |

FOREIGN PATENTS OR APPLICATIONS 1,474,776    3/1969    Germany ........................... 221/264

*Primary Examiner*—Allen N. Knowles
*Attorney, Agent, or Firm*—Lowe, King, Price & Markva

[57] ABSTRACT

An apparatus for dispensing individual planar, non-circular, uniform, articles, such as image projection slides, slide mounts or the like, from a stack of such articles, comprises a delivery shaft containing an aperture having a cross-section shaped to receive the stacked articles. A dispensing arrangement, located below the shaft, includes a rotary valve supported by a base member. The rotary valve and base member each contains an aperture corresponding in shape to, and coaxial with, the delivery shaft aperture. The apertures contained respectively in the delivery shaft and base member are angularly displaced relative to each other such that a stack of articles, placed in the shaft is supported by portions of the base member exposed through the shaft aperture. The rotary valve has a thicknesss less than or equal to the thickness of each of the articles, and is rotatable by means of a lever arm for orientation of the rotary valve aperture with either the delivery shaft aperture or base member aperture. As the valve is rotated, the lowest article in the stack is also rotated toward alignment with the base member aperture. When alignment is complete, the lowest article drops through the base member aperture onto a transportation medium, such as conveyor belt.

6 Claims, 3 Drawing Figures

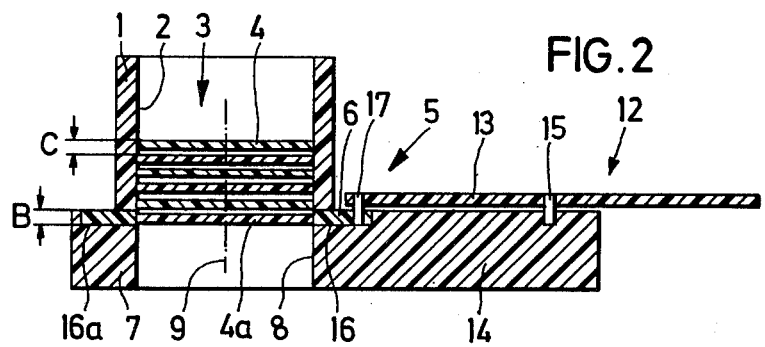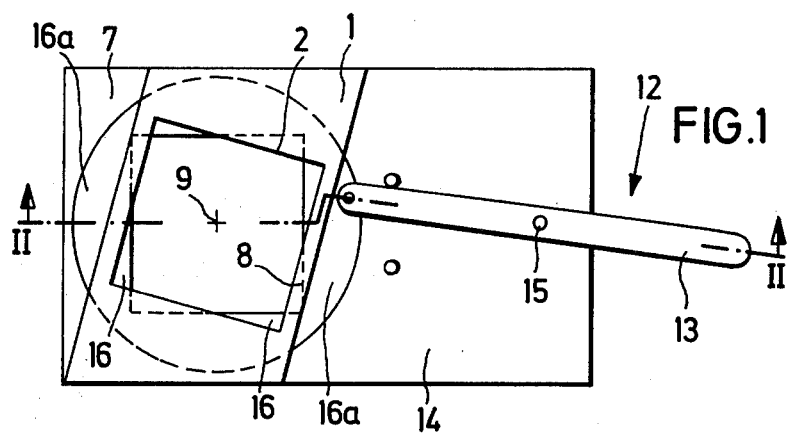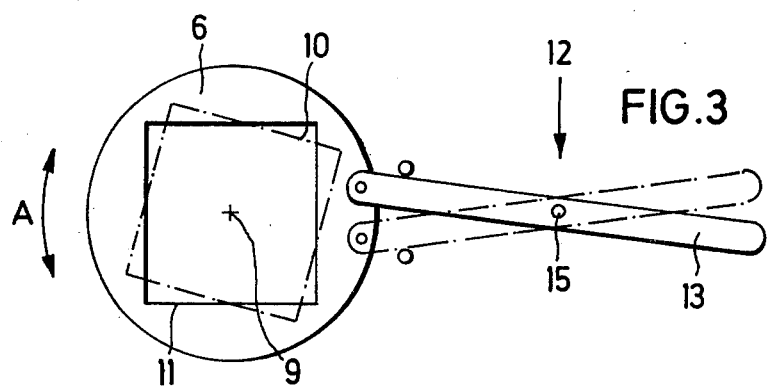

APPARATUS FOR DISPERSING PLANAR NON-CIRCULAR OBJECTS

BACKGROUND OF THE INVENTION

The present invention relates generally to apparatus for dispensing planar, non-circular, uniform, articles from a stack of such articles, and more particularly to apparatus for individually dispensing image projection slides, slide mounts or the like.

One prior apparatus for dispensing individual image projection slides or slide mounts includes a vertical shaft or cylinder for storing a stack of the slides. The lowest slide in the stack is removed by drawing the slide away from the cylinder through an outlet that is transverse to the cylinder axis. The dispensing speed of such apparatus is limited because the lowest slide tends to bind to the next lowest slide due to the weight of the stack, and operation is cumbersome.

OBJECTIVES OF THE INVENTION

Accordingly, one object of the invention is to provide a new and improved apparatus for dispensing planar, non-circular, uniform, articles such as image projection slides, slide mounts or the like.

Another object of the present invention is to provide a new and improved apparatus for dispensing planar, non-circular, uniform, articles at a high dispensing rate.

Another object of the present invention is to provide a new and improved apparatus for dispensing planar, non-circular, uniform, articles wherein binding of the dispensed article is eliminated.

SUMMARY OF THE INVENTION

In accordance with the invention, a dispensing apparatus comprises a rotary valve disposed between an upper delivery shaft and a base member. The upper delivery shaft, rotary valve and base member each contains an aperture having a cross-section corresponding to the shape of the articles to be dispensed. The apertures are coaxial to each other but the delivery shaft aperture and base member aperature are angularly displaced relative to each other. Accordingly, articles stacked in the delivery shaft are supported by portions of the base member exposed through the deliver shaft aperture.

The thickness of the rotary valve is equal to or less than the thickness of each of the articles to be dispensed. Initially, with the rotary valve aperture aligned to the delivery shaft aperture, the lowest article in the stack is seated in the rotary valve. As the rotary valve is rotated by means of a crank assembly, the lowest article is also rotated until it becomes aligned to the base member aperture, and the article drops down onto a conveyor belt, or the like.

Since the thickness of the rotary valve is less than or equal to the thickness of the individual articles to be dispensed, only the lowest article in the stack is rotated; the remaining articles in the stack are maintained stationary in the delivery shaft. Only a small amount of rotation of the rotary valve is required to dispense an article.

Preferably, the thickness of the rotary valve is somewhat less than the average thickness of the articles to be dispensed in order to avoid jamming the apparatus due to fluctuations in article thickness (as arise typically in injection molded articles). Furthermore, by forming the rotary valve with a preselected thickness, articles having variable thickness can be selectively dispensed e.g., the upper and lower portions of an image projection slide can be separated.

The crank assembly is pivoted to the base member and to the rotary valve. Lever arm action causes the rotary valve to rotate between alignment with the delivery shaft aperture and base member aperture with minimum movement of the crank. The drive means for the crank can be manual or electromagnetic, such as by using solenoids or rotary magnets. Rotation of the article during a dispensing operation may be limited by means of stops, or alternatively, by magnets as well as by design of the crank assembly itself.

The external shape of the rotary valve is circular and is mounted in a circular recess formed in the base member for free rotation. Preferably, to prevent binding, the rotary valve is formed of a self-lubricating material, such as molybdenum or graphite-lubricated nylon. The surface of the base member supporting the rotary valve is formed of a material to permit smooth operation of the rotary valve.

Still other objects and advantages of the present invention will be readily apparent to those skilled in this art from the following detailed description wherein I have shown and described only the preferred embodiment of the invention, simply by way of illustration of the best mode contemplated by me of carrying out my invention. As will be realized, the invention is capable of other and different embodiments, and its several details are capable of modification in various obvious respects, all without departing from the invention. Accordingly, the drawings and description are to be regarded as illustrative in nature, and not as restrictive.

BRIEF DESCRIPTION OF THE DRAWINGS

FIG. 1 is a plan view of a preferred embodiment of the invention;

FIG. 2 is a vertical cross-sectional view taken along the line II—II in FIG. 1; and FIG. 3 is a plan view of the rotary valve in its two rotary positions.

DETAILED DESCRIPTION OF A PREFERRED EMBODIMENT

Referring to FIG. 1, a dispensing apparatus, in accordance with the invention, comprises an upper delivery shaft 1 containing a square aperture 2 into which is stored a stack 3 of planar articles 4. The articles 4, arranged one on top of the other, have a square outside contour, e.g., image projection slides, slide mounts or the like.

A dispensing arrangement, designated generally by the numeral 5 is provided below cylinder 1. The dispensing arrangement 5 includes a rotary valve 6 seated in a circular recess 16a formed in base member 7. The base member 7 contains an aperture 8 corresponding to aperture 2 of upper delivery shaft 1, and the apertures are coaxial to each other along common center axis 9. However, aperture 2 in upper delivery shaft 1 is angularly displaced relative to aperture 8 in base member 7, as shown in FIG. 1.

Rotary valve 6 can be reciprocated (see arrow A in FIG. 3) between a position 10 and a position 11. In position 11, the square aperture of rotary valve 6 is aligned with aperture 8 in base member 7, while in position 10, the rotary valve aperture is aligned with aperture 2 in upper delivery shaft 1. An aperture formed in the valve 6 is defined by at least two diametrically opposed inner side walls of valve 6, and corresponds to apertures 2 and 8.

Rotary valve 6 is coaxial to apertures 2 and 8, and lies along the center axis 9. In order to achieve reciprocating movement of valve 6, one end of a lever arm 13 (constituting crank assembly 12, schematically shown in FIG. 3) is linked to the rotary valve, and an intermediate portion of the arm is mounted on a trunion or pivot pin 15 located on an extended portion 14 of base member 7.

Since base member 7 is angularly displaced relative to upper delivery shaft 1, portions 16 of base member 7 project into aperture 2. Accordingly, the lowest article 4a of stack 3 rests on portions 16 of base member portion 14. However, when rotary valve 6 is rotated to position 11 (FIG. 3) to be in alignment with aperture 8 of support member 7, the lowest article 4a is rotated correspondingly. When object 4a reaches position 11 of rotary valve 6, the article drops through aperture 8 and is then moved away by means of a transportation arrangement such as a conveyor belt (not shown). The remaining articles 4 in stack 3 cannot drop through aperture 8 because upper delivery shaft 1 is fixed to base member 7; it does not rotate with rotation of rotary valve 6 and does not act to rotate article 4a.

Thickness B of rotary valve 6 is less than or equal to thickness C of one of the articles 4 or to the thickness of article 4a. In practice, thickness B is somewhat less than thickness C in order to ensure that fluctuations in the thickness of article 4 will not impair the dispensing operation.

Rotary valve 6 has a circular outer profile and is mounted in circular recess 16a formed in base member 7. Lever arm 13 is linked to rotary valve 6 with pin 17 (FIG. 2). Preferably, rotary valve 6 if formed of a self-lubricating material, such as molybdenum or graphite-lubricated nylon. The supporting surface of recess 16 is formed of a suitable material permitting free rotation of rotary valve 6.

In the disclosure, there is shown and described only the preferred embodiment of the invention, but, as aforementioned, it is to be understood that the invention is capable of use in various other combinations and environments, and is capable of changes or modifications within the scope of the inventive concept as expressed herein. For example, although the dispensing apparatus is shown in conjunction with dispensing image projection slides, slide mounts or the like, wherein the apertures are square, it is to be understood that by modifying the shape of apertures 2 and 8, and of rotary valve 6, the apparatus can be adapted to dispense any substantially planar, non-circular, uniform article. Furthermore, it is to be understood that cranking mechanism 12 can be operated manually or automatically, e.g., by means of solenoids or rotary magnets.

I claim:

1. Apparatus for dispensing single, essentially planar, non-circular, uniform, articles stacked in a delivery shaft including a dispensing mechanism arranged below said delivery shaft, said dispensing mechanism comprising a rotary valve having an aperture for receiving a lowest one of said articles, said valve being rotatable about a center axis of said delivery shaft; a base member disposed below said rotary valve, each of said delivery shaft and said base member having an aperture corresponding in shape to each other and to the articles being dispensed, said delivery shaft aperture and said base member aperture being angularly displaced relative to each other along said center axis; said base member having a center, said base member aperture being located to one side of the center of said base member; and a crank assembly linked to said rotary valve for providing reciprocating movement of said rotary valve between a first position aligned with said delivery shaft aperture and a second position aligned with said base member aperture; said crank assembly including an arm having one end linked to said rotary valve, and a free end extending beyond said base member, an intermediate portion of said arm being pivoted on a pin attached to said base member and located to the opposite side of the center, reciprocating movement of said free end of said arm remote to said rotary valve thereby imparting opposite reciprocating movement of said valve.

2. The apparatus as in claim 1, wherein the thickness of said rotary valve is less than an average thickness of said articles to be dispensed.

3. The apparatus of claim 1, wherein the shape of said rotary valve aperture corresponds to the shape of said delivery shaft aperture and said base member aperture.

4. The apparatus of claim 3, wherein each of said delivery cylinder aperture, said base member aperture and said rotary valve aperture is square.

5. The apparatus as in claim 1, wherein an outer surface of said rotary valve is circular, and said rotary valve is mounted in a circular recess formed in said base member.

6. The apparatus as in claim 1, wherein said rotary valve is formed of a self-lubricating material.

* * * * *